Figure 1:
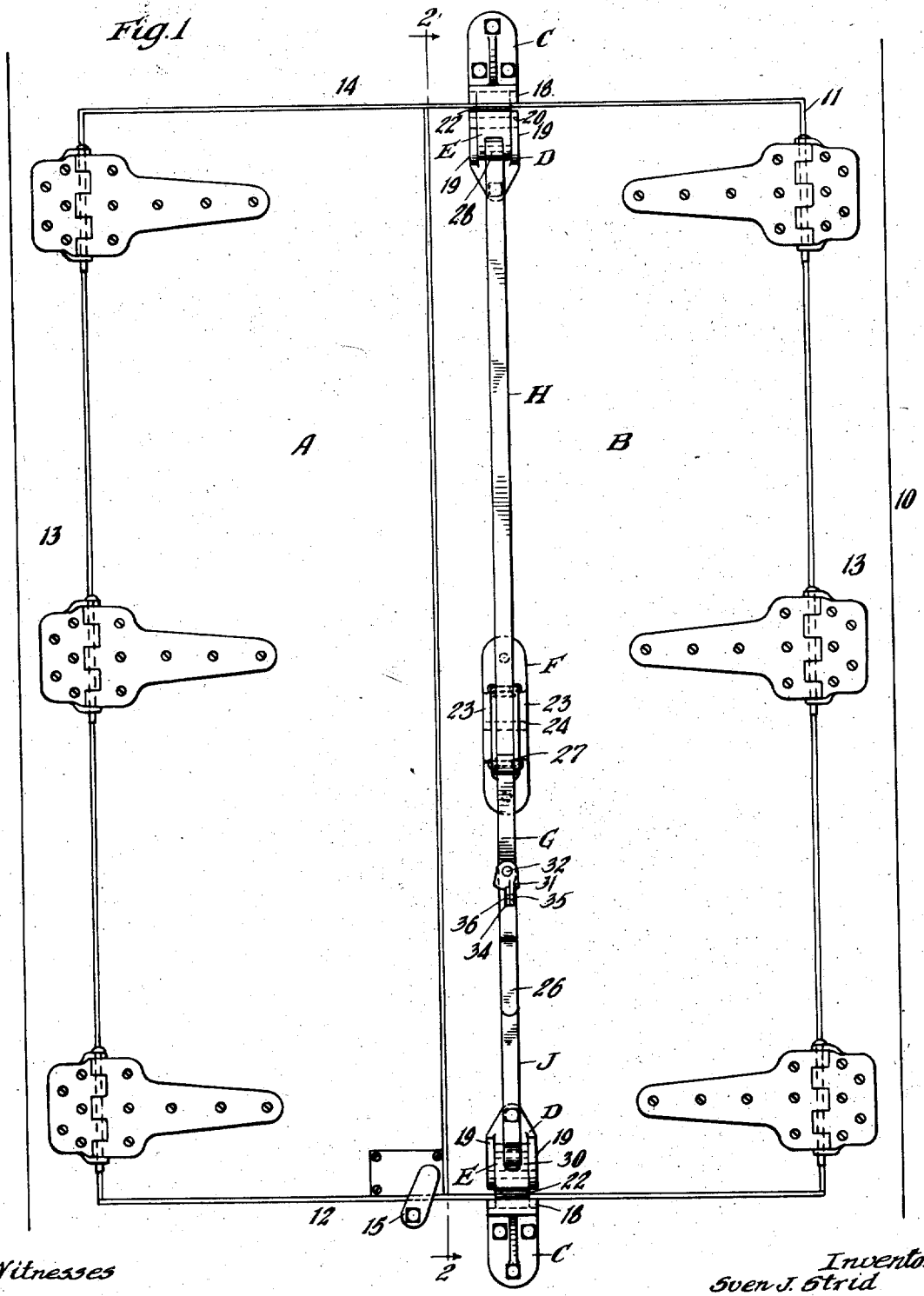

June 5, 1928. Re. 16,987

S. J. STRID

DOOR FASTENER

Original Filed Dec. 2, 1920 2 Sheets-Sheet 1

Witnesses

Wm. Geiger

Inventor

Sven J. Strid

By George L. Vaught

Atty.

June 5, 1928. Re. 16,987
S. J. STRID
DOOR FASTENER
Original Filed Dec. 2, 1920 2 Sheets-Sheet 2
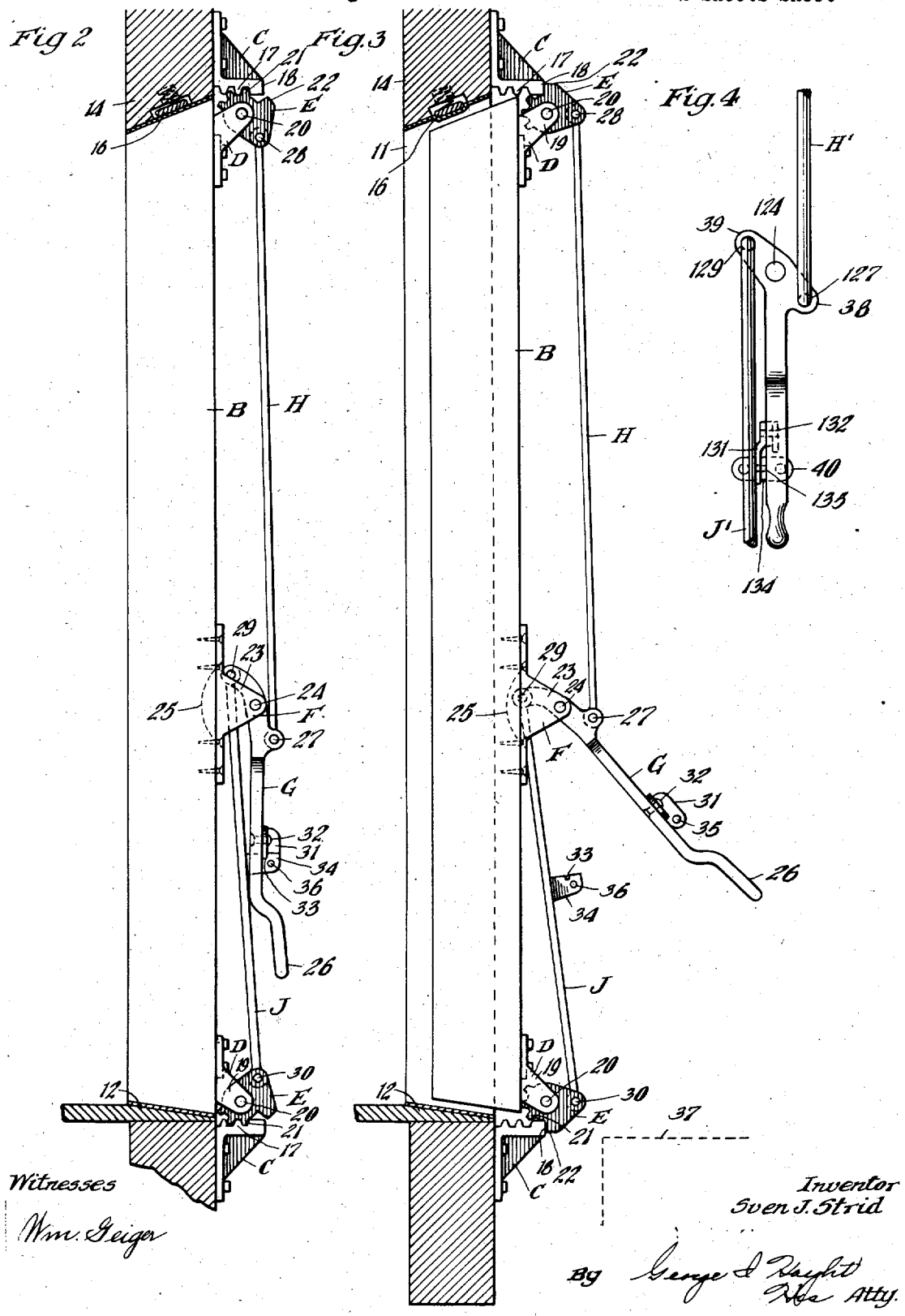

Reissued June 5, 1928.

Re. 16,987

UNITED STATES PATENT OFFICE.

SVEN J. STRID, OF CHICAGO, ILLINOIS, ASSIGNOR, BY MESNE ASSIGNMENTS, TO W. H. MINER, INC., A CORPORATION OF DELAWARE.

DOOR FASTENER.

Original No. 1,439,385, dated December 19, 1922, Serial No. 427,813, filed December 3, 1920. Application for reissue filed August 9, 1924. Serial No. 731,190.

This invention relates to improvements in door fastener.

In railroad refrigerator cars, the almost universal practice is to employ spring pressed packing at the joints in order to obtain as hermetic a seal as possible when the doors are in closed position. On account of the spring pressed packing or insulation, considerable pressure is required to force the doors to fully closed position and also to initiate the opening movements. Very frequently, moisture collects on the insulation and then freezes around the edges of the doors, thereby making it extremely difficult to open the doors. It is therefore of prime importance in an operating mechanism for doors of refrigerator cars, that the mechanism be adapted to exert great force in both the final closing movements and also in the beginning of the opening movements of the doors. Furthermore, due to limitations of maximum over-all width of any car employed on a railroad, it necessarily follows that, in order to permit of the maximum width and carrying capacity of the refrigerator car body proper, the mechanism applied to the outside of the door should extend or project outwardly therefrom a minimum distance to thereby avoid injury when the refrigerator car passes another car or any stationary object along the roadway.

As is well known, refrigerator cars are loaded and unloaded from platforms which are generally made substantially flush with or slightly lower than the car floor in order to facilitate the trucking in and out of the load. In most door operating devices for refrigerator cars heretofore employed, a portion of the mechanism has extended several inches below the bottom edge of the swinging door to which it is applied so that, in attempting to swing the door back and forth over a platform flush or even a few inches below the car floor level, difficulty has been experienced frequently necessitating the chopping away of portions of the platform to provide the necessary clearance for the mechanism.

One object of my invention is to provide an efficient, durable and strong mechanism for hinged or swinging doors, and more especially for refrigerator car doors where great pressure is required in effecting the final closing and initial opening movements of the door.

Other objects of the invention are to provide a mechanism of the character indicated in the preceding paragraph so designed that the mechanism may be easily operated either from a loading platform or by the operator when standing on the ground; to provide a mechanism of the general character hereinbefore indicated so arranged that the mechanism will avoid projecting below the lower edge of the movable door on which the mechanism is mounted for more than approximately an inch whereby the door may be readily swung back and forth over a loading platform, which is positioned an inch or two below the level of the car floor.

In the drawings forming a part of this specification, Figure 1 is a side elevational view of a portion of a refrigerator car showing my improvements employed in connection therewith. Figure 2 is a vertical sectional view, corresponding substantially to the line 2—2 of Figure 1 and showing the refrigerator door in fully closed position. Figure 3 is a view similar to Figure 2 but illustrating the position of one of the doors and the operating mechanism associated therewith corresponding to either the initial engagement of the gears with the racks to effect final closure of the door or the final engagement between the gears and the keeper racks at the end of the forced opening movement. And Figure 4 is a detail, elevational view, illustrating a somewhat different embodiment of the invention.

Referring first to the construction illustrated in Figures 1 to 3 inclusive, the car wall is indicated at 10, in which is provided the usual side door opening of generally rectangular form as indicated at 11. As customary, said door opening is defined by a threshhold 12, side door posts 13—13 and a beveled lintel 14. The door shown is of the usual type comprising two members A and B, each of which is hinged along one of its vertical edges, said doors having beveled meeting edges. As will be understood by those skilled in the art, the door A is adapted to be first moved to closed position, where it may be so held by a pivoted latch 15 and the other door member B is finally closed by the operating mechanism, as hereinafter described. It is customary in refrigerator cars, to provide spring pressed packing or insulation around the two vertical sides and top edge of the door and also between the beveled meeting edges of the two door members A and B. The most common form of said spring pressed packing is indicated at 16 in Figures 2 and 3.

In carrying out my invention, I employ, broadly, upper and lower keepers C—C, secured to the car wall; upper and lower brackets D—D, secured to the door member B; a pair of segmental gears E—E pivotally attached to the brackets D; a central bracket F secured to the door member B; an operating handle or lever G pivotally mounted on the bracket F; and links H and J extending between the lever G and the gears E—E.

The keepers C—C are secured to the car wall on the outer side thereof immediately above and immediately below the top and bottom edges, respectively, of the door member B, at points fairly close to the free edge of the door member B, as clearly indicated in Figure 1. The members C—C extend perpendicularly outwardly from the car wall and each has a short horizontally extending toothed rack 17—17, it being observed from an inspection of Figures 2 and 3 that the teeth 17 of the upper rack or keeper C extend toward or face the teeth of the lower keeper C. Each keeper C is furthermore provided at its outer end with a shoulder 18 for the purpose hereinafter described.

The brackets D—D are preferably of like construction and each is secured to the door member B at such a point that it will be brought into vertical alinement with the keeper C when the door member B is in closed or approximately closed position. One of the members D is located adjacent the top edge and the other adjacent the lower edge of the door member B as clearly indicated in the drawing. Each member D is secured in position by any suitable means, as for instance lag screws and is provided with a pair of outwardly extended spaced flanges 19—19 between which is accommodated the corresponding segmental gear E. The latter are mounted on suitable pivot pins 20 in such a way as to adapt the segmental gears E to oscillate or rotate about axes extending horizontally and parallel to the outer face of the door member B. Each of the segmental gears E is provided with a plurality of teeth 21 adapted to co-operate with the teeth 17 in effecting the final closure and initial opening of the door member B. In addition, each gear E is formed with a radially extended shoulder 22 that extends from the axis of the gear E a greater distance than any of the teeth 21. Said shoulders 22 are so located that they are adapted to engage the respective shoulders 18 of the keepers C as indicated in Figure 3, that is, in such a way as to permit the teeth 21 of the gears passing by the outer ends of the keepers but so positioned that said teeth 21 are operatively engaged or meshed with the teeth 17 of the keepers. In other words, the shoulders 22 of the segmental gears E act to insure proper registration of the gears and racks.

The bracket F is secured to the door member B approximately at the center thereof in vertical alinement with the brackets D. Said bracket F has also a pair of outstanding spaced arms 23—23 between which is pivotally mounted the lever G on the horizontally extending pivot 24. The bracket F may be cut away at its center and the door proper undercut as indicated at 25 in Figures 2 and 3 so as to provide ample clearance for the swinging movements of the inner end of the lever G. Said lever G, at its lower free end, is offset as indicated at 26 to provide a hand grip which will be spaced from the lower link J when the door is in closed position as indicated in Figure 2. The link H is pivotally connected to the lever G as indicated at 27 and the upper end of said link is pivotally connected to the upper segmental gear E as indicated at 28. The lower link J is pivotally connected at its top end to the innermost end of the lever G as indicated at 29 in Figure 3 and the lower end of said link J is pivotally connected as indicated at 30. With the arrangement just described, it is obvious that the lever G is adapted to swing in a plane perpendicular to the face of the door member B and when so swung, the segmental gears E will be simultaneously operated but in reverse directions, that is, one gear E will be rotated in a clockwise and the other simultaneously in a counter-clockwise direction so that the effect produced at the top and bottom edges of the door member B is uniform.

In order to lock the door mechanism when the door member B is in fully closed position, any suitable means may be employed as for instance a latch 31 pivotally mounted on the lever G as by rivet 32, said latch 31 having a plate adapted to engage with a notch 33 formed in an outstanding flange 34 carried by the lower link J. In this manner, it is obvious that the lever G cannot be swung away from the door until the latch plate 31 is swung out of position with respect to the notch 33. To provide for the usual lead seal, the latch 31 may be perforated as indicated at 35 and the flange 34 correspondingly perforated as indicated at 36, said perforations being in register when the lever G is in closed position.

In Figure 3 I have illustrated by dotted lines 37 a loading platform, the top of which is slightly below the floor level of the car. Taking into consideration the scale employed on the drawing, the top of said platform is approximately one inch below the floor level and it will be noted that the lower segmental gear E will clear said platform in the swinging movements of the door member B.

Some railroads prefer that the operating handle for a door mechanism swing in a plane parallel to the outer face of the door to which the mechanism is applied. Figure 4 illustrates a modification adapted to comply with this requirement. As there shown, the links H′ and J′ are the same as or correspond to the links H and J shown in the other figures, and it will be seen that the segmental gears, keepers and brackets will remain the same.

Instead of showing a lever mounted as shown in Figures 2 and 3, however, the lever G′ is pivotally mounted on a stud or axis 124 which extends perpendicular to the face of the door member so that said lever G′ is itself adapted to swing in a plane parallel to the face of the door member. The lever G′ is formed with oppositely extended flanges 38 and 39 in line with the pivot 124 to which the links H′ and J′ are respectively pivotally attached as indicated at 127 and 129.

The door mechanism illustrated in Figure 4 may be locked in closed position by any suitable means as for instance a latch 131, pivotally attached to the lever G′ as indicated at 132, said latch 131 being adapted to engage over a flange 134 formed on a bracket 40 secured to the face of the door member. The latch 131 and flange 134 may have alined perforations as indicated at 135 to accommodate the usual lead seal.

Due to the fact that the door member B swings about a vertical axis during the operation of the door mechanism, the teeth 17 and 21 will preferably be tapered radially with the pivotal axis of the door member B as a center but in view of the fact that said taper is so small, I have not deemed it necessary to illustrate the same in detail in the drawings.

I have herein shown and described what I now consider the preferred manner of carrying out the invention but the same is merely illustrative, and I contemplate all changes and modifications that come within the scope of the claims appended hereto.

I claim:

1. In a refrigerator car having a door opening and a door hinged to swing about a fixed axis at one of its vertical edges, the combination with upper and lower toothed keepers secured to the outer face of the car wall above and below said door opening, respectively, the teeth of the keepers projecting toward each other; of gears pivotally mounted on said door near its edges at the top and bottom thereof, said pivotally mounted gears being located to engage said keepers when the door is in closed and nearly closed position; and manually operable means for rotating said gears about their respective pivots while in engagement with said keepers to thereby effect final closing and initial opening movements of the door.

2. In a refrigerator car having a door opening and a door hinged to swing about a fixed axis at one of its vertical edges, the combination with upper and lower toothed keepers secured to the outer face of the car wall above and below said door opening, respectively, the teeth of the keepers projecting toward each other; of gears pivotally mounted on said door near its edges at the top and bottom thereof, said pivotally mounted gears being located to engage said keepers when the door is in closed and nearly closed position; and manually operable means for rotating said gears about their respective pivots while in engagement with said keepers to thereby effect final closing and initial opening movements of the door, said means including, a lever pivotally mounted on the door intermediate said gears and a link connection between said lever and each gear.

3. In a door operating mechanism of the character described, the combination with a member having a door opening and a door hinged to swing about one of its vertical edges; of upper and lower toothed keepers secured to the outer face of said member above and below the door opening, the teeth of said keepers extending toward each other; of upper and lower brackets secured to said door near its free edge and adjacent the top and bottom thereof; a gear pivotally mounted in each of said brackets and adapted to swing about a horizontal axis extending parallel to the face of said door, said gears being arranged to engage said keepers when the door is in closed and nearly closed position; and manually operable means for effecting rotation of said gears simultaneously about their respective axes.

4. In a refrigerator car having a door opening and a door hinged to swing about one of its vertical edges, the combination with upper and lower toothed keepers secured to the outer face of the car wall above said door opening, the teeth of the keepers extending toward each other; of gears pivotally mounted on said door near its edges at the top and bottom thereof, said pivotally mounted gears being located to engage said keepers when the door is in closed and nearly closed position; and manually operable means for rotating said gears about their respective pivots while in engagement with said keepers to thereby effect final closing and initial opening movements of the door, each of said gears having a radially extending shoulder adapted to initially engage the outer end of the corresponding keeper to insure proper registration of the gears and toothed keepers.

5. In a refrigerator car having a door opening and a door hinged to swing about one of its vertical edges, the combination with upper and lower toothed keepers secured to the outer face of the car wall above said door opening, the teeth of the keepers extending toward each other; of gears pivotally mounted on said door near its edges at the top and bottom thereof, said pivotally mounted gears being located to engage said keepers when the door is in closed and nearly closed position; manually operable means for rotating said gears about their respective pivots while in engagement with said keepers to thereby effect final closing and initial opening movements of the door, said means including, a lever pivotally mounted on the door intermediate said gears and a link connection between said lever and each gear; and co-operating locking devices on said lever and one of said links.

6. In a refrigerator car having a door opening and a door for closing said opening, the combination with upper and lower keepers secured to the car wall adjacent said door opening; of upper and lower door actuating members pivotally mounted on said door for movement in reverse directions in a plane at an angle to the plane of the door, said members each having a portion projecting beyond the adjacent edge of the door adapted for engagement with the corresponding keeper to impart movement to said door in opening and closing directions; and operating means for simultaneously actuating said members to oscillate the latter about their respective pivots.

7. In a refrigerator car having a door opening and a rectangular door for closing said opening, said door being hinged at one of its edges to swing about a fixed axis; of a pair of door actuating elements pivotally mounted on the door near the free edge thereof opposite to said hinged edge, one of said members being disposed adjacent each of the remaining two edges of said rectangular door, each of said members having its pivotal axis disposed at an angle to the axis on which said door is hinged; an extension on each of said members projecting beyond the corresponding edge of the door; and a pair of keepers mounted on the side wall of the car adjacent said door opening, each of said keepers being adapted to be engaged by the extension of one of said members; and means for simultaneously oscillating said members on their respective pivots to move the door, to force the same either open or tightly closed.

8. In a refrigerator car having a door opening and a door for closing said opening, said door being hinged to swing about a fixed axis; of means for actuating said door to force the same open or tightly closed, said means including a plurality of keepers and a corresponding number of co-operating pivoted door moving members engageable therewith, said members having shouldered engagement with the keepers either in door opening or closing movement of said members; and means for simultaneously operating said members, said members being mounted on said door adjacent opposed free edges thereof and having their pivot axes angularly disposed with reference to the axis about which said door swings.

SVEN J. STRID.